(12) United States Patent
Wen et al.

(10) Patent No.: US 6,426,976 B1
(45) Date of Patent: Jul. 30, 2002

(54) MOTION VECTOR PREDICTION METHOD

(75) Inventors: Jiangtao Wen; John D. Villasenor, both of Los Angeles, CA (US); Jeong-hoon Park, Seoul; Dong-seek Park, Daegu, both of (KP)

(73) Assignees: Samsung Electronics Co., Ltd., Kyungki-Do (KR); Regents of the University of California, Oakland, CA (US)

( * ) Notice: Subject to any disclaimer, the term of this patent is extended or adjusted under 35 U.S.C. 154(b) by 0 days.

(21) Appl. No.: 09/201,816

(22) Filed: Dec. 1, 1998

Related U.S. Application Data

(60) Provisional application No. 60/067,015, filed on Dec. 1, 1997.

(51) Int. Cl.[7] .................................................. H04N 7/18
(52) U.S. Cl. .............................. 375/240.17; 375/240.16
(58) Field of Search ........................ 375/240.12–240.17

(56) References Cited

U.S. PATENT DOCUMENTS

| | | | | |
|---|---|---|---|---|
| 5,886,742 A | * | 3/1999 | Hibi et al. .............. | 375/240.17 |
| 6,026,195 A | * | 2/2000 | Elfrig et al. .................. | 382/236 |
| 6,175,593 B1 | * | 1/2001 | Kim et al. .............. | 375/240.17 |

FOREIGN PATENT DOCUMENTS

| | | | | |
|---|---|---|---|---|
| EP | 0 798 929 | 10/1997 | ............ | H04N/7/30 |
| JP | 2-226985 | 9/1990 | .......... | H04N/7/137 |
| JP | 5-115061 | 5/1993 | .......... | H04N/7/137 |
| JP | 6-105299 | 4/1994 | .......... | H04N/7/133 |
| JP | 6-153181 | 5/1994 | .......... | H04N/7/137 |
| JP | 7-30896 | 1/1995 | ............ | H04N/7/32 |
| JP | 8-79767 | 3/1996 | ............ | H04N/7/32 |
| JP | 8-251601 | 9/1996 | ............ | H04N/7/32 |
| JP | 9-51540 | 2/1997 | ............ | H04N/7/32 |
| JP | 9-154141 | 6/1997 | ............ | H04N/7/32 |
| JP | 9-187016 | 7/1997 | ............ | H04N/7/32 |
| JP | 10-136369 | 5/1998 | ............ | H04N/7/32 |
| JP | 10-136374 | 5/1998 | ............ | H04N/7/32 |

* cited by examiner

*Primary Examiner*—Andy Rao
(74) *Attorney, Agent, or Firm*—Sughrue Mion, PLLC

(57) ABSTRACT

A motion vector prediction method in an error resilient mode. In the motion vector prediction method capable of decoding backwards, motion vectors of macro blocks are calculated, and motion vectors of macro blocks each having one motion vector are predicted while moving to another macro block from left to right, and motion vectors of macro blocks each having four motion vectors are continuously predicted in a predetermined sequence to have correlation in prediction of the four motion vectors. Thus, in the motion vector prediction method based on the image signal compression method of the MPEG-4 or H.263 standard, the motion vector prediction is performed with continuity and correlation among the motion vectors, so that two-way decoding is possible during transmission of blocks with a predetermined packet, resulting in better error resilient characteristics.

3 Claims, 1 Drawing Sheet

MOTION VECTOR PREDICTION METHOD

CROSS REFERENCE TO RELATED APPLICATIONS

This application is an application filed under 35 U.S.C. §111(a), claiming benefit pursuant to 35 U.S.C. §119(e)(1) of the filing date of the Provisional Application, No. 60/067, 015, filed Dec. 1, 1997, pursuant to 35 U.S.C. §111(b).

BACKGROUND OF THE INVENTION

1. Field of the Invention

The present invention relates to a motion vector prediction method, and more particularly, to a motion vector prediction method in an error resilient mode.

2. Description of the Related Art

In general, redundancy of a moving picture must be effectively eliminated so as to compress the moving image. The moving picture experts group (MPEG) adopts a motion prediction method. According to the motion prediction method, the current frame is divided into a plurality of macro blocks, and then each macro block (reference block) is compared with each macro block (matching block) of a previous frame within a given area, to calculate the difference therebetween. Then, the macro blocks having the lowest difference are selected to calculate motion vectors representing the difference in positions between the reference and matching blocks. In the motion vector prediction, the difference between a predicted motion vector and actual motion vector of the current block is encoded, in place of encoding the motion vector itself of the current block, thereby improving coding efficiency.

FIG. 1 is a diagram illustrating a conventional motion prediction method and coding sequence adopted in the MPEG-4 and the H.263 standards.

In FIG. 1, reference numerals 10 through 18 represent macro blocks each consisting of 16 pixels×16 pixels, reference numerals 10 and 16 are macro blocks each having one motion vector, and reference numerals 12, 14 and 18 represents macro blocks each 10 having four motion vectors. The macro blocks 12, 14 and 18 are divided into four subblocks of 8 pixels×8 pixels, based on the MPEG-4 or the H.263 standard, and those four motion vectors are calculated from the four subblocks.

Here, prior to transmission of the difference among each 15 motion vector, motion vector prediction is separately performed in upper subblocks 121, 122, 141 and 142 and lower subblocks 123, 124, 143 and 144 of the macro blocks 12 and 14 from the macro block 10 in a solid arrow direction. Here, a motion vector is predicted from motion vectors calculated in the upper subblock 142, the macro blocks 16 and the subblocks 181 through 184 of the macro block 18 with correlation. However, the motion vector prediction is not performed between the motion vectors of the subblock 144 and the macro block 16, and the motion vector prediction continues toward the lower subblocks 183 and 184 from the macro block 16.

Thus, if an error occurs, the motion vector can be decoded from the macro block 16 toward the upper subblock 142 in a backward direction. However, if an error occurs in the lower subblock 123 of the macro block 12, it is not possible to reversely calculate the motion vectors of the subblock 144 and its left subblock 143 from the macro block 16 using a motion vector prediction code.

As a result, it is not possible to decode the blocks following the erroneous block, thereby increasing loss in motion vector value. Although an error concealment is adopted, there is a problem of loss of information.

SUMMARY OF THE INVENTION

To solve the above problems, it is an object of the present invention to provide a motion vector prediction method capable of restoring a motion vector lost after an error occurs, through backward decoding, even when information is lost during transmission due to the error.

Accordingly, to achieve the above object, there is provided a motion vector prediction method capable of decoding backwards, comprising the steps of: (a) calculating motion vectors of macro blocks; and (b) predicting motion vectors of macro blocks each having one motion vector while moving to another macro block from left to right, and motion vectors of macro blocks each having four motion vectors continuously in a predetermined sequence to have correlation in prediction of the four motion vectors.

Preferably, in the step (b) when one macro block has one motion vector, the motion vector prediction of the current block is performed using the motion vector of the macro block on the left of the current block or the previous coded macro block.

Preferably, in the step (b) when one macro block has four motion vectors, the motion vectors are continuously predicted from the motion vectors of the upper-left, lower-left, lower-right and upper-right subblocks in sequence.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
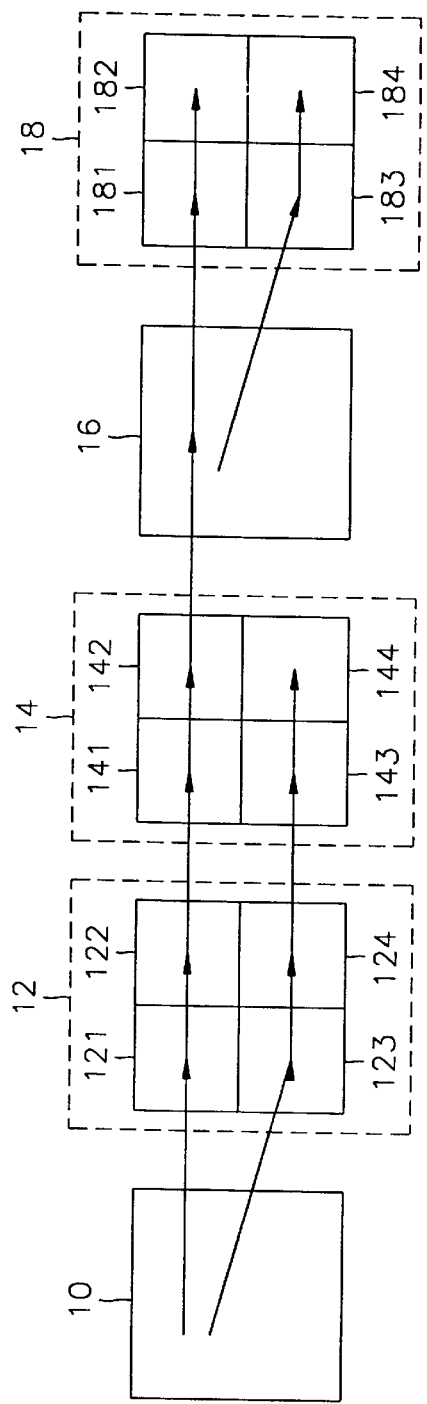
FIG. 1 is a diagram illustrating a general motion prediction method and coding sequence according to the MPEG-4 and the H.263 standard.
Figure 2:
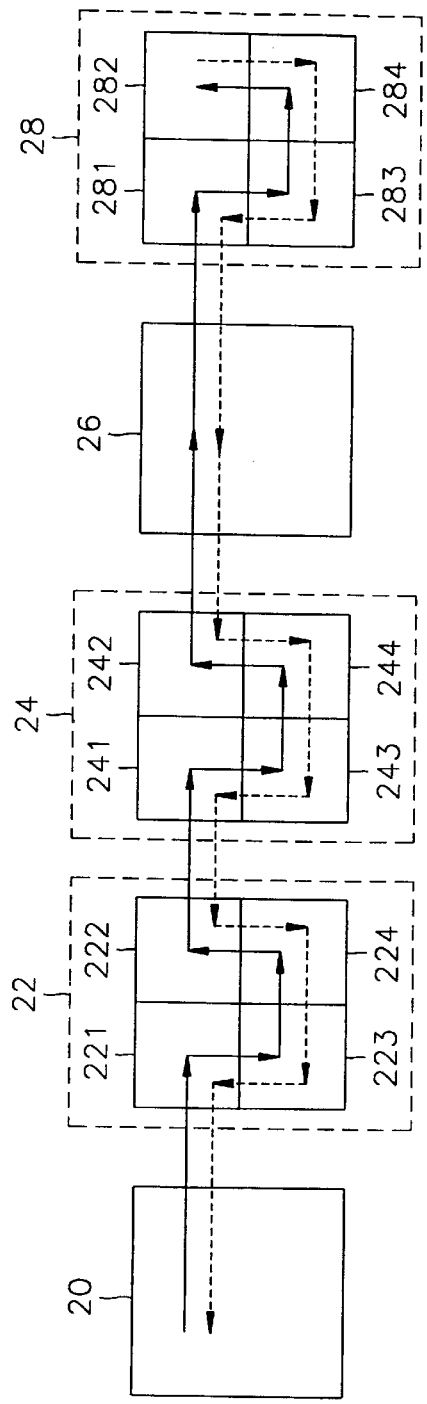
FIG. 2 is a diagram illustrating a motion vector prediction method which allows a backward decoding in an error resilient mode, and coding and decoding sequences according to the present invention.

Referring to FIG. 2, wherein a motion vector prediction method capable of decoding backwards in an error resilient mode, and coding and decoding sequences according to the present invention are illustrated, there are shown macro blocks which are the same as in FIG. 1. Here, reference numerals 20 and 26 represent macro blocks each having one motion vector, and reference numerals 22, 24 and 28 represents macro blocks each having four motion vectors. The macro blocks 22, 24 and 28 are divided into four subblocks of 8 pixels×8 pixels and those four motion vectors are calculated in the four subblocks.

The motion vectors are predicted in a solid arrow direction as shown in FIG. 2. That is, the motion vectors are predicted from the macro block 20 toward the macro block 22 having four motion vectors, through subblocks 221, 223, 224 and 222 in sequence, and then through subblocks 241, 243, 244 and 242 of the macro block 24. The prediction of motion vectors continues in the macro blocks 26 and 28 in the direction indicated by solid arrows.

Thus, in case that an error occurs in the subblock 223 and the macro block 28 is the last macro block of the erroneous group of blocks (GOB) when the difference between motion vectors is transmitted, motion vectors of non-erroneous blocks can be restored by reversely decoding in sequence from the subblock 282 of the macro blocks 28 in the direction indicated by dashed arrows. This is because the motion vector prediction continues with a correlation among the motion vectors of each block.

While the present invention has been illustrated and described with reference to a specific embodiment, further modifications and alterations within the spirit and scope of this invention as defined by the appended claims will occur to those skilled in the art.

As described above, in the motion vector prediction method according to the present invention, which is based on the image signal compression method of the MPEG-4 or H.263 standard, the motion vector prediction is performed with continuity and correlation among the motion vectors, so that two-way decoding is possible during transmission of blocks with a predetermined packet, resulting in better error resilient characteristics.

What is claimed is:

1. A motion vector prediction method capable of decoding backwards, comprising the steps of:

(a) calculating motion vectors of macro blocks; and (b) predicting motion vectors of macro blocks each having one motion vector while moving to another macro block from left to right, and motion vectors of macro blocks each having four motion vectors continuously in a predetermined sequence to have correlation in prediction of the four motion vectors within each of the macro blocks having four motion vectors.

2. The motion vector prediction method of claim 1, wherein in the step (b) when one macro block has one motion vector, the motion vector prediction of the current block is performed using the motion vector of the macro block on the left of the current block or the previous coded macro block.

3. A motion vector prediction capable of decoding backwards, comprising the steps of:

(a) calculating motion vectors of macro blocks; and (b) predicting motion vectors of macro blocks each having one motion vector while moving to another macro block from left to right, and motion vectors of macro blocks each having four motion vectors continuously in a predetermined sequence to have correlation in prediction of the four motion vectors, wherein in the step (b) when one macro block has one motion vector, the motion vector prediction of the current block is performed using the motion vector of the macro block on the left of the current block or the previous coded macro block, and wherein in the step (b) when one macro block has four motion vectors, the motion vectors are continuously predicted from the motion vectors of the upper-left, lower-left, lower-right and upper-right subblocks in sequence.

\* \* \* \* \*